(12) United States Patent
Kitahara

(10) Patent No.: US 8,223,245 B2
(45) Date of Patent: Jul. 17, 2012

(54) IMAGING LENS AND IMAGE PICKUP APPARATUS

(75) Inventor: Yu Kitahara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 67 days.

(21) Appl. No.: 12/787,011

(22) Filed: May 25, 2010

(65) Prior Publication Data

US 2010/0302431 A1    Dec. 2, 2010

(30) Foreign Application Priority Data

May 26, 2009    (JP) ................ P2009-126150

(51) Int. Cl.
*G02B 13/16* (2006.01)
*H04N 5/225* (2006.01)

(52) U.S. Cl. ......... 348/335; 348/340; 348/345; 348/348

(58) Field of Classification Search ............... 348/240.3, 348/208.4, 335, 340, 345, 348; 359/554; 396/111, 114

See application file for complete search history.

(56) References Cited

U.S. PATENT DOCUMENTS

| | | | |
|---|---|---|---|
| 4,340,279 A | 7/1982 | Ikemori | |
| 4,596,447 A * | 6/1986 | Yamada et al. | ........ 359/674 |
| 5,682,269 A | 10/1997 | Kimura et al. | |
| RE37,846 E | 9/2002 | Matsuzawa et al. | |
| 2001/0050818 A1 | 12/2001 | Wada et al. | |
| 2003/0117722 A1 | 6/2003 | Chen | |

FOREIGN PATENT DOCUMENTS

| | | | |
|---|---|---|---|
| JP | 62249119 A | * | 10/1987 |
| JP | 5-224119 A | | 9/1993 |
| JP | 05224119 A | * | 9/1993 |
| JP | 11-271610 A | | 10/1999 |
| JP | 2009-151046 A | | 7/2009 |

OTHER PUBLICATIONS

Extended European Search Report issued on Jun. 29, 2010 in corresponding European Patent Application No. 10163903.7

\* cited by examiner

*Primary Examiner* — Yogesh Aggarwal

(74) *Attorney, Agent, or Firm* — Birch, Stewart, Kolasch & Birch, LLP

(57) ABSTRACT

Disclosed is an imaging lens capable of improving weatherability, reducing performance degradation, and obtaining an optical performance excellent across a wide wavelength region from the visible wavelength region to the near-infrared wavelength region. An imaging lens for forming an image of visible and near-infrared light includes, in order from the object side: a front group that has a positive power; an aperture stop; and a rear group that has a negative power. In the imaging lens, the rear group includes a negative meniscus lens that is disposed closer to the object side and has a surface convex toward the object side, and a biconvex lens that is disposed closer to the image side. In addition, all the lenses constituting the imaging lens are single lenses.

11 Claims, 10 Drawing Sheets

EXAMPLE 1

FIG.3 EXAMPLE 2

EXAMPLE 5

EXAMPLE 6

EXAMPLE 1

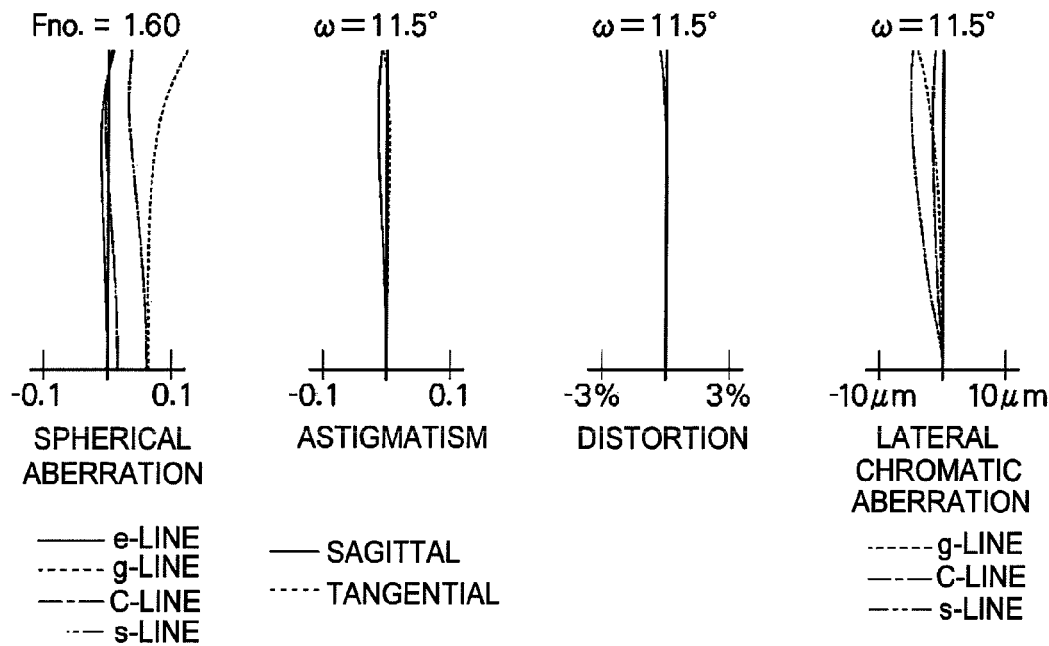
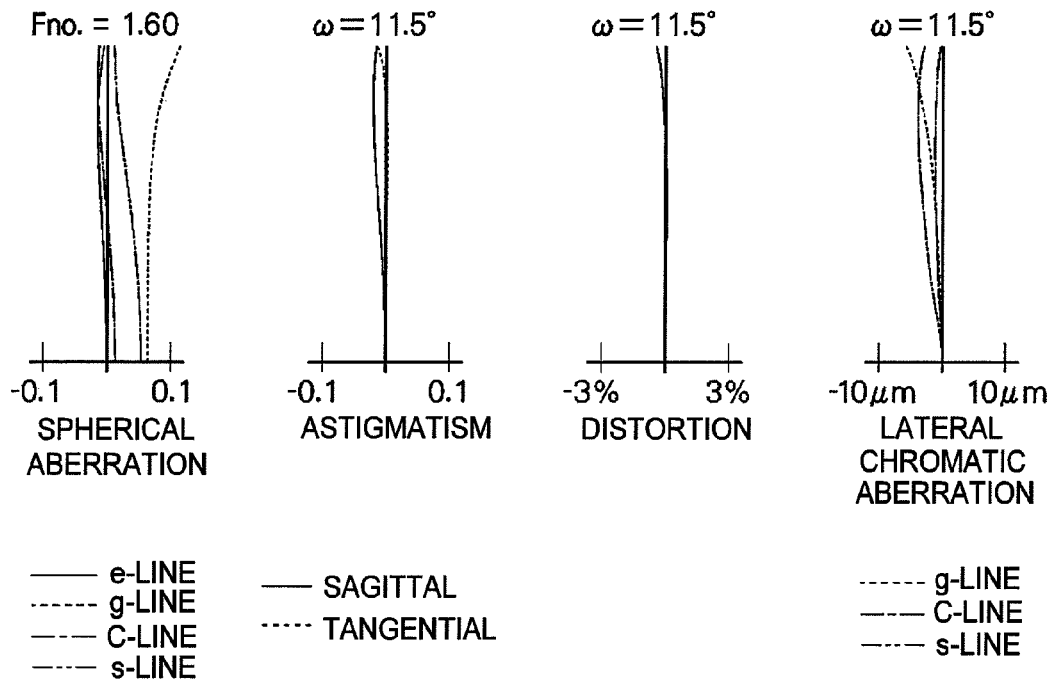

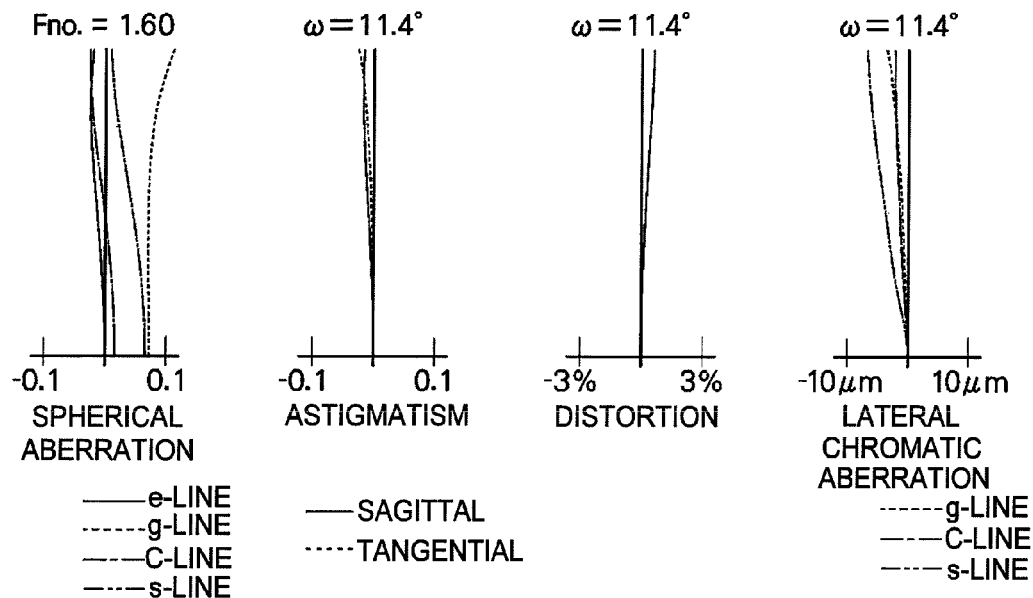
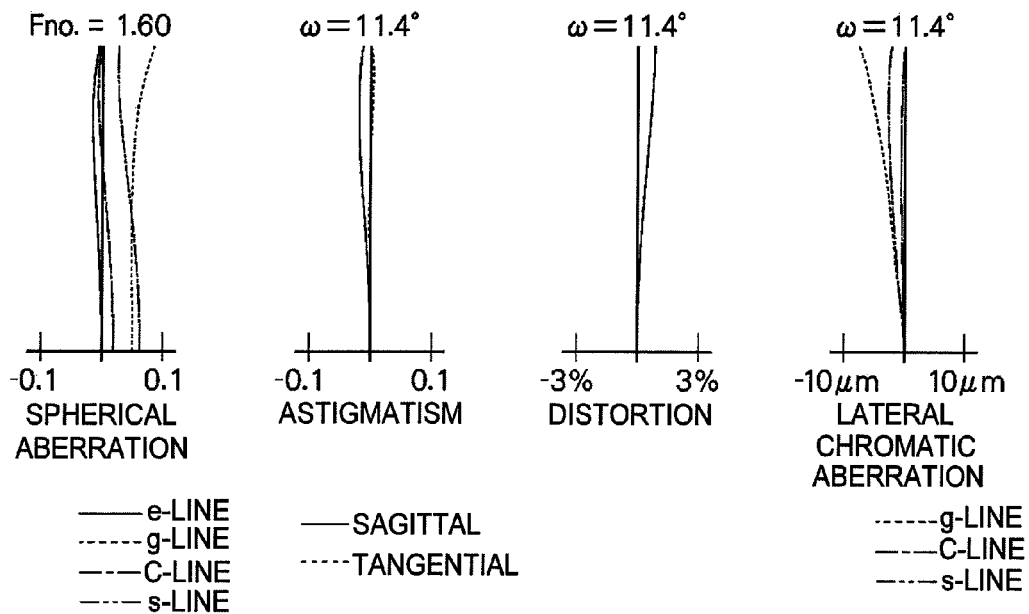

EXAMPLE 6

IMAGING LENS AND IMAGE PICKUP APPARATUS

CROSS-REFERENCE TO RELATED APPLICATIONS

This application is based upon and claims the benefit of priority from the Japanese Patent Application No. 2009-126150 filed on May 26, 2009, the entire contents of which are incorporated herein by reference.

BACKGROUND OF THE INVENTION

1. Field of the Invention

The present invention relates to an imaging lens for forming an image of visible and near-infrared light and an image pickup apparatus having the same.

2. Description of the Related Art

In the past, there have been known on-board cameras for photographing surroundings to the front and back sides of a vehicle in order to secure the safety of vehicle travel, and there have also been known security surveillance cameras for photographing suspicious individuals and the like. Some known on-board cameras and some known surveillance cameras are equipped with an imaging lens formed as an optical system including a cemented lens serving as a medium telephoto imaging lens (refer to JP-A-11-271610, JP-A-5-224119, and Japanese Patent Application No. 2007-328236).

SUMMARY OF THE INVENTION

However, the on-board cameras and the surveillance cameras are mostly used day and night in a way that a visible light image is taken in daytime and a near-infrared image is taken in nighttime. Hence, in theses cameras, there is demand for the use of a fast (small F number) imaging lens capable of forming an image in light ranging across a wide wavelength region from the visible wave length region to the near-infrared wavelength region and capable of night photography and the like.

Furthermore, in the on-board cameras and the surveillance cameras, there is demand for an imaging lens in which performance degradation is small during use in the outside air of a cold region or inside a vehicle in the summer of a tropical region.

The demand for such performance is not limited to the imaging lens used in the on-board cameras and the surveillance cameras, but is common to the imaging lenses used under severe environments.

The invention has been made in view of the above situation, and it is desirable to provide an imaging lens and an image pickup apparatus for which weatherability is high, performance degradation is small, and optical performance is excellent across a wide wavelength region from the visible wavelength region to the near-infrared wavelength region.

According to a first aspect of the invention, an imaging lens for forming an image of visible and near-infrared light includes, in order from the object side: a front group that has a positive power; an aperture stop; and a rear group that has a negative power. In the imaging lens, the rear group includes a negative meniscus lens that is disposed closer to the object side and has a surface convex toward the object side, and a biconvex lens that is disposed closer to the image side. In addition, all the lenses constituting the imaging lens are single lenses.

In this case, it is preferable that the front group should include, in order from the object side, an object side lens section that has a positive power and is formed of one or more lenses in which a lens surface closest to the object side is convex and at least one lens surface is concave, a single positive meniscus lens that has a surface convex toward the object side, and a single negative lens that has a surface concave toward the image side.

Further, it is preferable that the imaging lens should satisfy both Expression (1) of $1.8 < nd3 < nd4$ and Expression (2) of $15 < vd3 - vd4$. In addition, it is more preferable that the imaging lens should satisfy both Expression (1') of $1.82 < nd3 < nd4$ and Expression (2') of $20 < vd3 - vd4 < 25$.

Here, nd3 is the refractive index of the positive meniscus lens of the front group at the d-line, vd3 is the Abbe number of the positive meniscus lens of the front group at the d-line, nd4 is the refractive index of the negative lens of the front group at the d-line, and vd4 is the Abbe number of the negative lens of the front group at the d-line.

Further, it is preferable that the object side lens section of the front group should include a negative meniscus lens that has a surface convex toward the object side, and a positive lens that has a surface convex toward the object side.

Furthermore, it is preferable that the object side lens section of front group should include a single positive meniscus lens that has a surface convex toward the object side.

According to a second aspect of the invention, an image pickup apparatus includes: the above-mentioned imaging lens; and an image pickup device that converts an optical image, which is formed by the imaging lens, into an electric signal.

Furthermore, the wavelength range from the visible to the near-infrared corresponds to the range from 450 nm to 1000 nm.

According to the aspects of the invention, the imaging lens for forming an image of visible and near-infrared light is configured to include, in order from the object side: the front group that has a positive power; the aperture stop; and the rear group that has a negative power. In the imaging lens, the rear group includes the negative meniscus lens that is disposed closer to the object side and has a surface convex toward the object side, and the biconvex lens that is disposed closer to the image side. In addition, all the lenses constituting the imaging lens are single lenses. With such a configuration, it is possible to obtain a high-quality optical system of which weatherability is high, performance degradation caused by environmental change is small, and optical performance is excellent across a wide wavelength region from the visible wavelength region to the near-infrared wavelength region.

Specifically, since all the lenses constituting the imaging lens are configured to be single lenses, it is not necessary to dispose a bonding agent for forming a cemented lens in the optical path. In addition, performance degradation of the imaging lens is not likely to be caused by expansion and contraction of bonding material resulting from temperature and humidity, deterioration of the bonding material, or the like. With such a configuration, it is possible to obtain an imaging lens in which performance degradation caused by long-time use and environmental changes is small.

In addition, the change in propagation direction of the rays from lens surfaces constituting the imaging lens can be made to be relatively small. In addition, it is possible to suppress occurrence of spherical aberration across the wide wavelength range from the visible to the near-infrared. As a result, it is possible to achieve a fast imaging lens with a large aperture ratio (the F number is small).

Further, the rear group is configured to include the biconvex lens that is disposed closer to the image side, and a negative meniscus lens that is disposed closer to the object side and has a surface convex toward the object side. Therefore, the incident angles of the rays from the lens surfaces of the rear group are made to be relatively large. In addition, it is possible to prevent light, which is reflected from a light receiving surface for receiving light of the image formed by the imaging lens, from being reflected from any one lens surface of the rear group and being incident again on the light receiving surface. With such a configuration, it is possible to prevent ghosting from occurring in the image formed by the light receiving surface. The light receiving surface is disposed so as to correspond to the imaging plane of the imaging lens.

Furthermore, some rays are reflected from the light receiving surface, are reflected again from the any one lens surface of the front group through the rear group, and are incident again on the light receiving surface through the rear group. In this case, most of the rays traveling through the optical path can be cut off by the aperture stop.

In addition, since the negative meniscus lens, which has a surface convex toward the object side, is disposed in the rear group, it is possible to suppress occurrence of spherical aberration and comatic aberration while minimizing the entire length of the imaging lens.

Further, since the biconvex lens is disposed in the rear group, it is possible to elongate the back focal length as compared with the entire length of the lens.

BRIEF DESCRIPTION OF THE DRAWINGS

FIG. 9 is a diagram illustrating various aberrations of the imaging lens according to Example 2;

FIG. 10 is a diagram illustrating various aberrations of the imaging lens according to Example 3;

FIG. 11 is a diagram illustrating various aberrations of the imaging lens according to Example 4;

FIG. 12 is a diagram illustrating various aberrations of the imaging lens according to Example 5;

DESCRIPTION OF THE PREFERRED EMBODIMENTS

Figure 1:
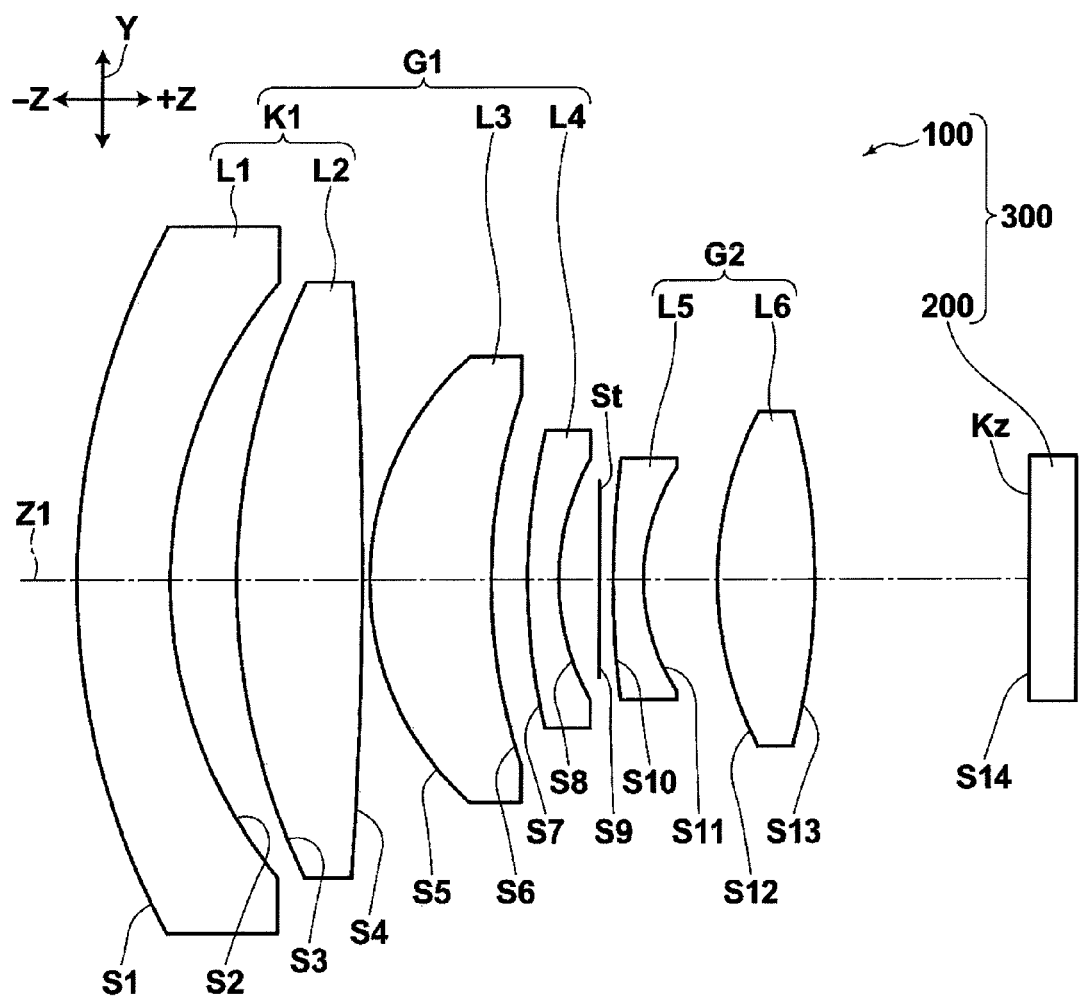
FIG. 1 is a sectional view illustrating a schematic configuration of an imaging lens according to an embodiment of the invention.
Figure 2:
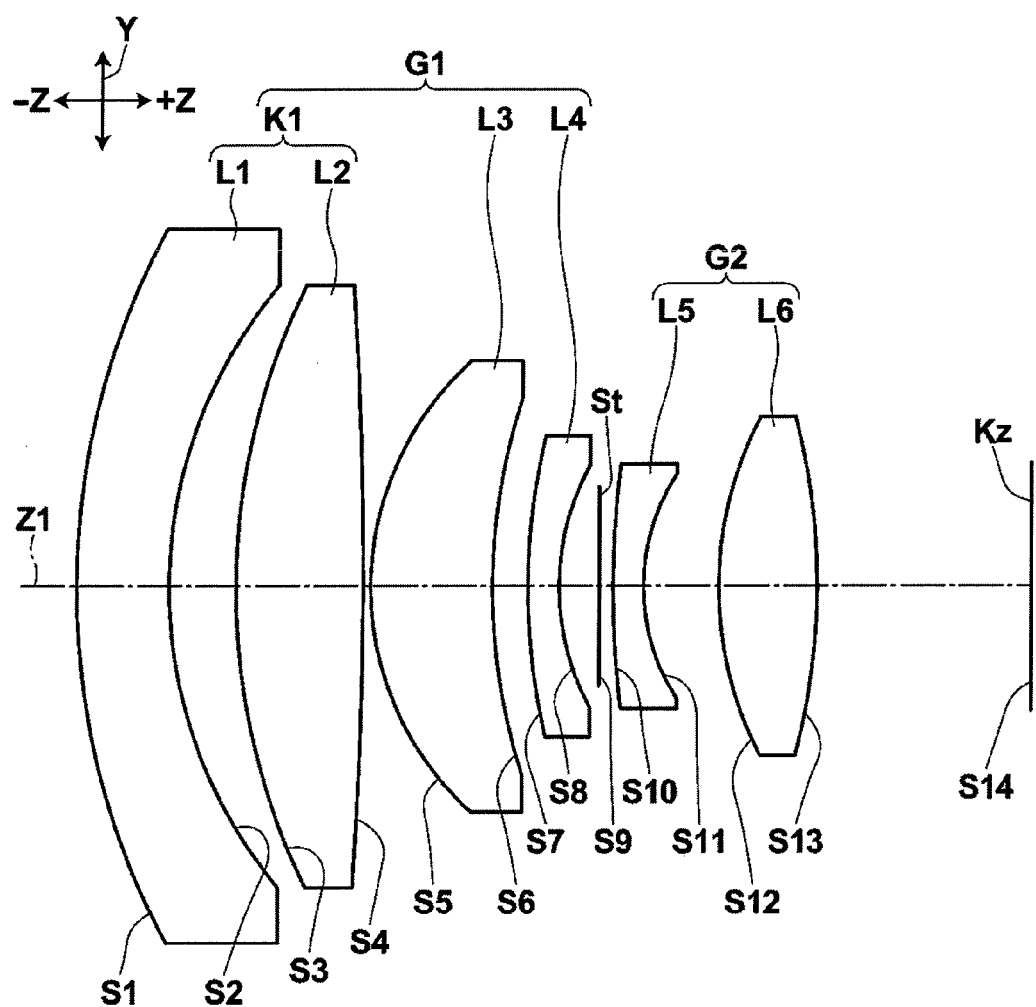
FIG. 2 is a sectional view illustrating a schematic configuration of an imaging lens according to Example 1.
Figure 3:
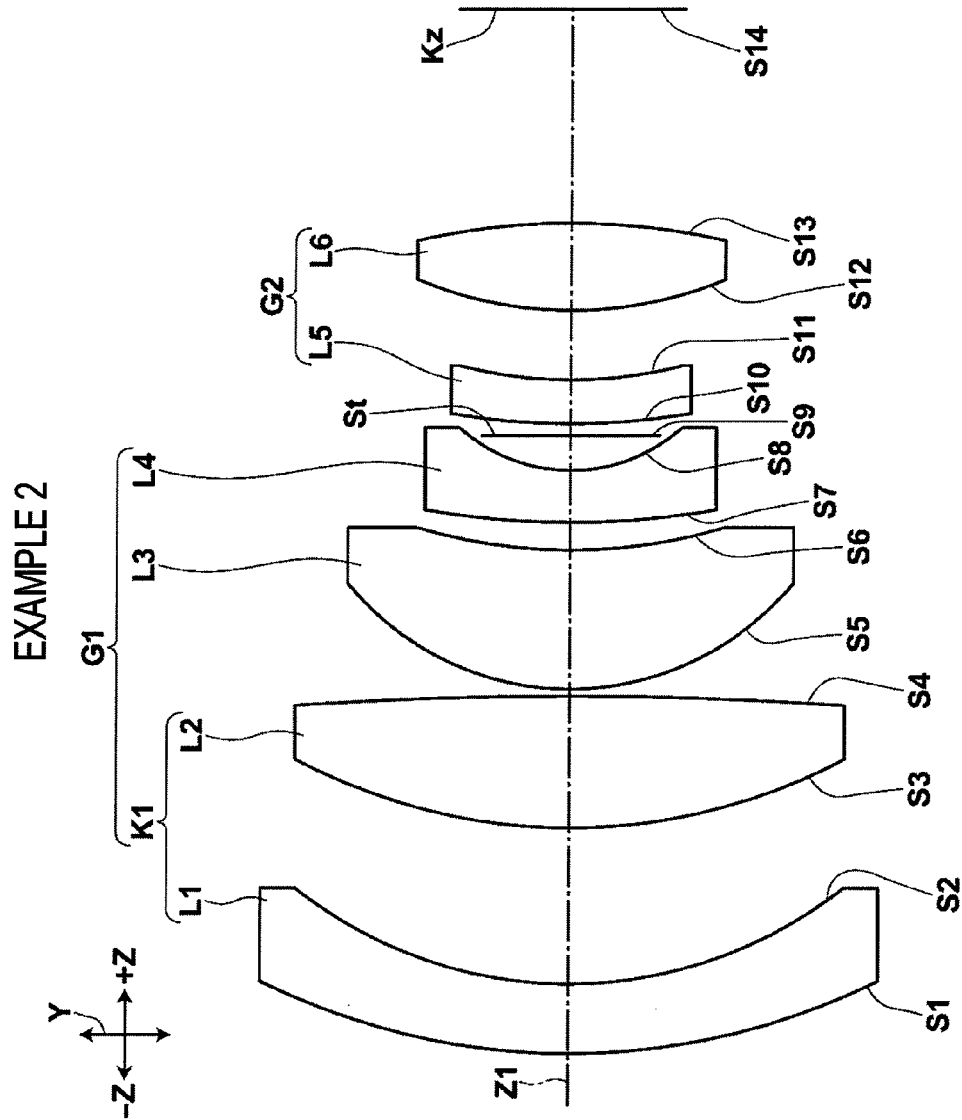
FIG. 3 is a sectional view illustrating a schematic configuration of an imaging lens according to Example 2.
Figure 4:
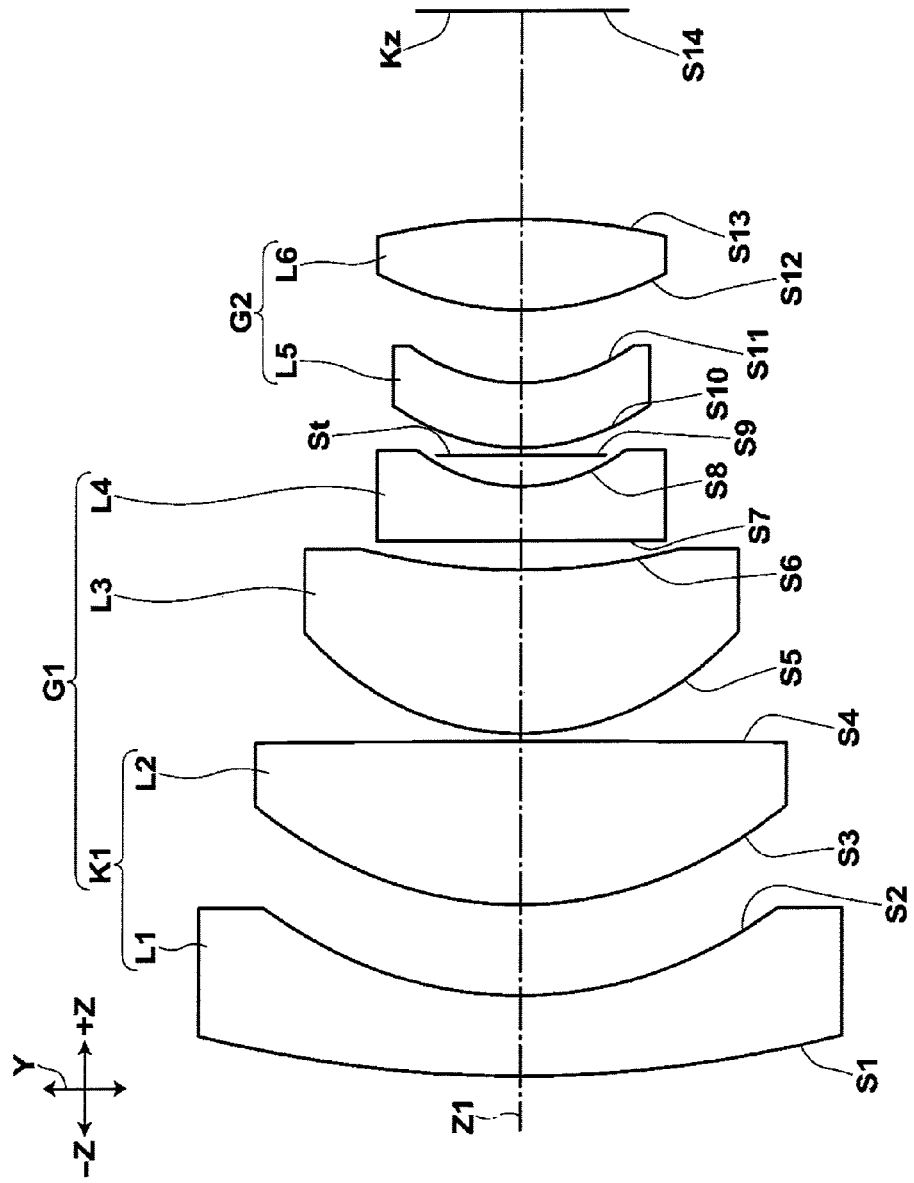
FIG. 4 is a sectional view illustrating a schematic configuration of an imaging lens according to Example 3.
Figure 5:
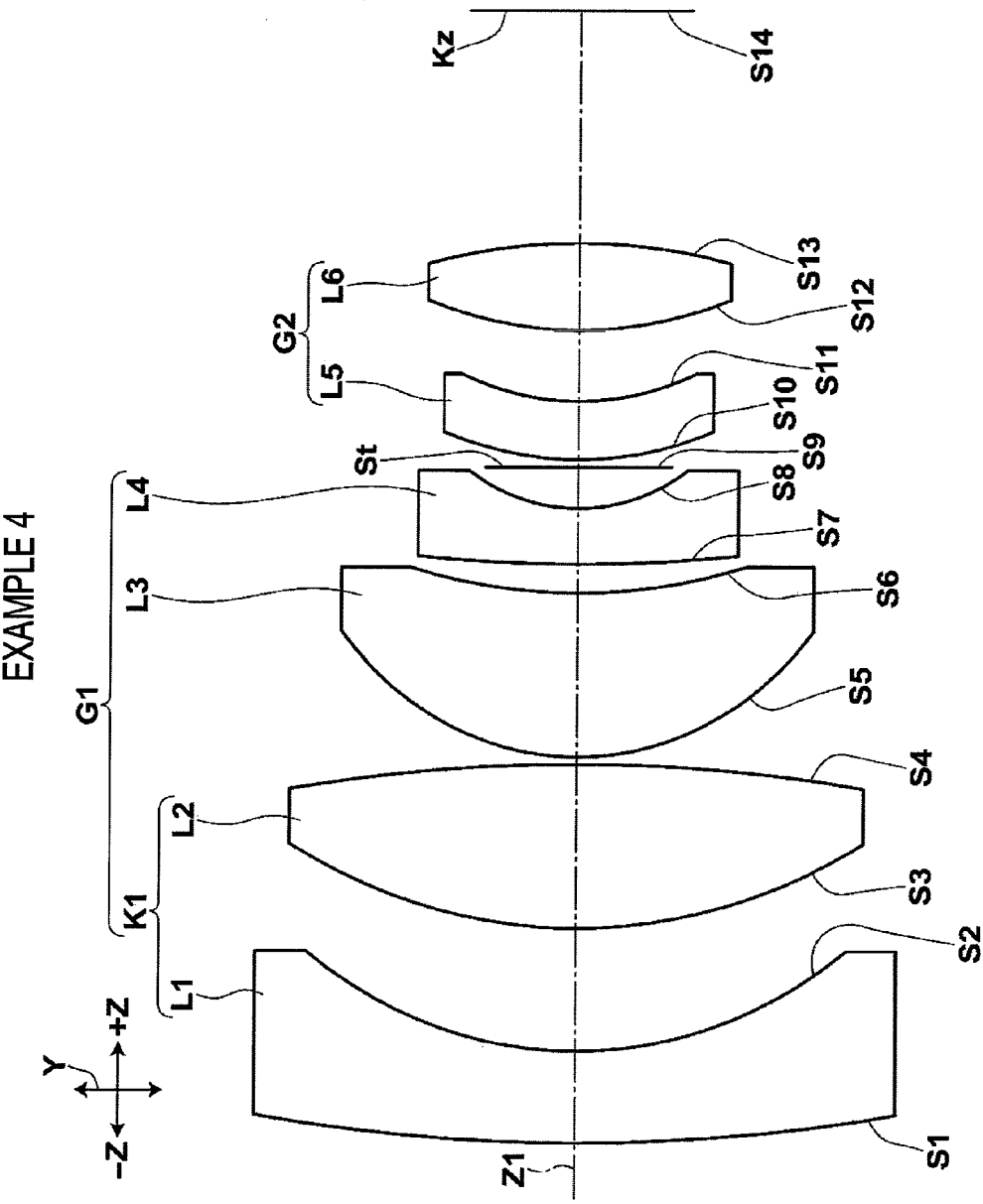
FIG. 5 is a sectional view illustrating a schematic configuration of an imaging lens according to Example 4.
Figure 6:
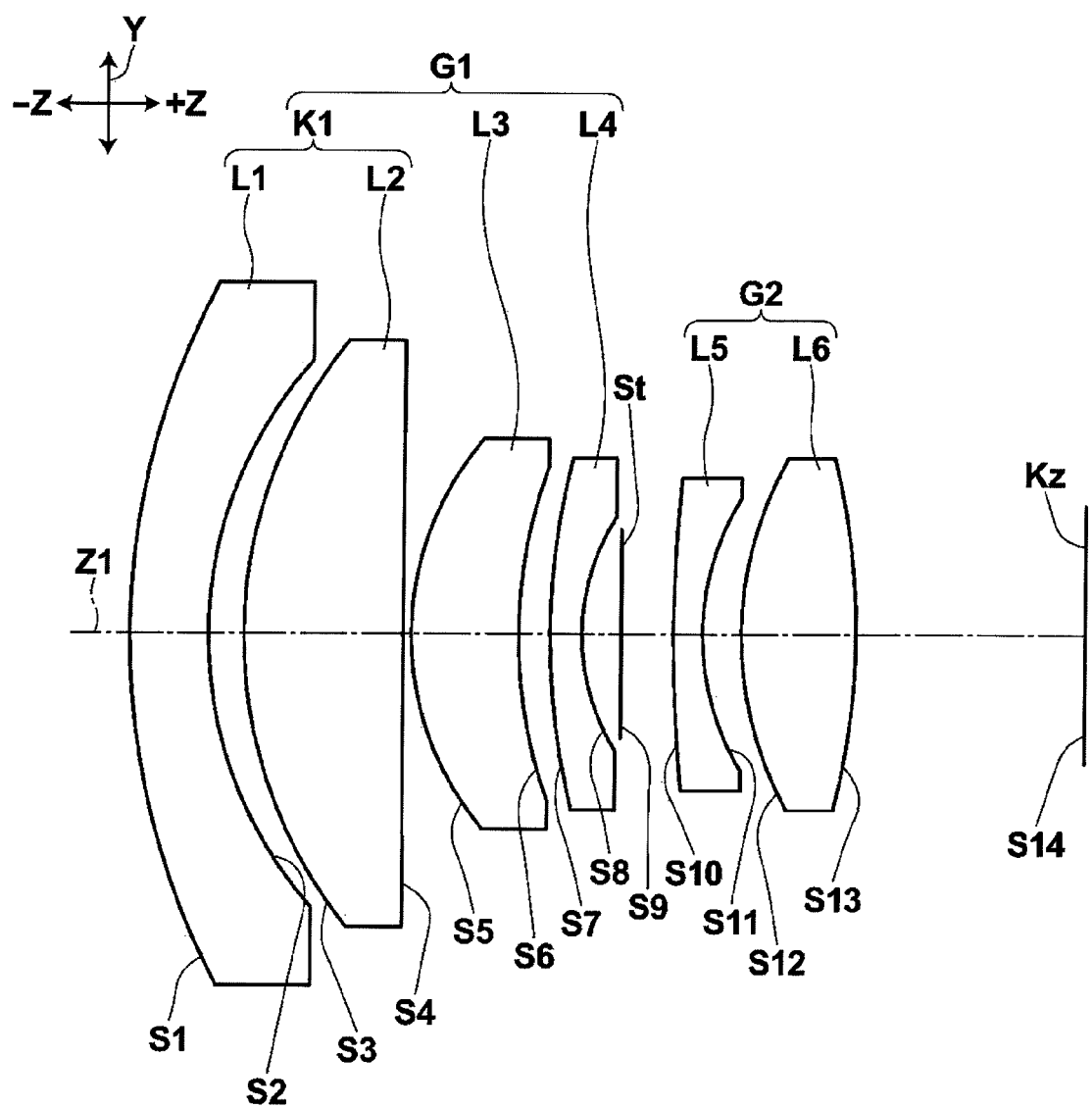
FIG. 6 is a sectional view illustrating a schematic configuration of an imaging lens according to Example 5.
Figure 7:
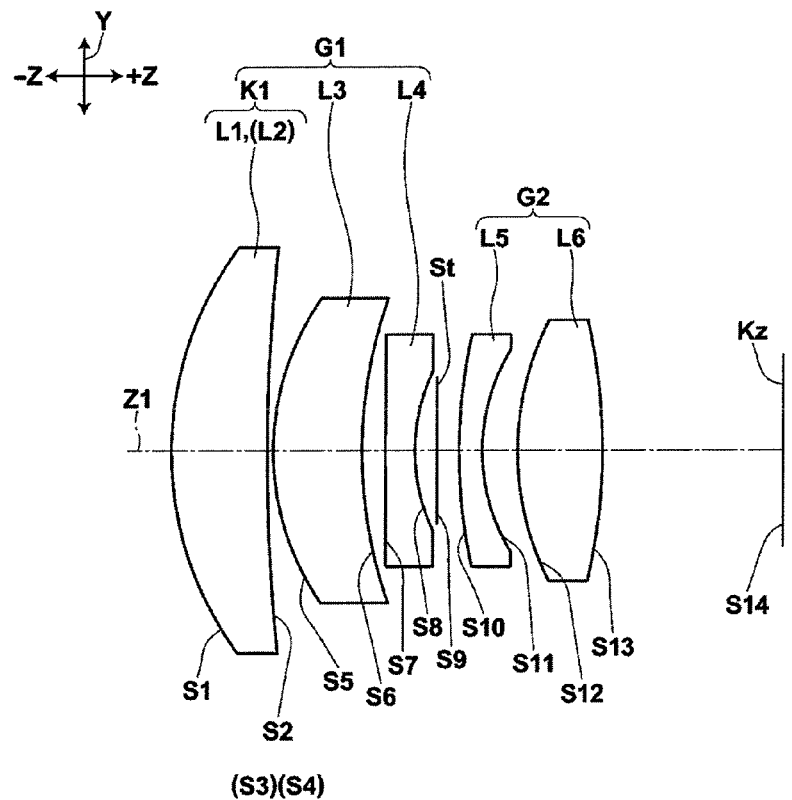
FIG. 7 is a sectional view illustrating a schematic configuration of an imaging lens according to Example 6.
Figure 8:
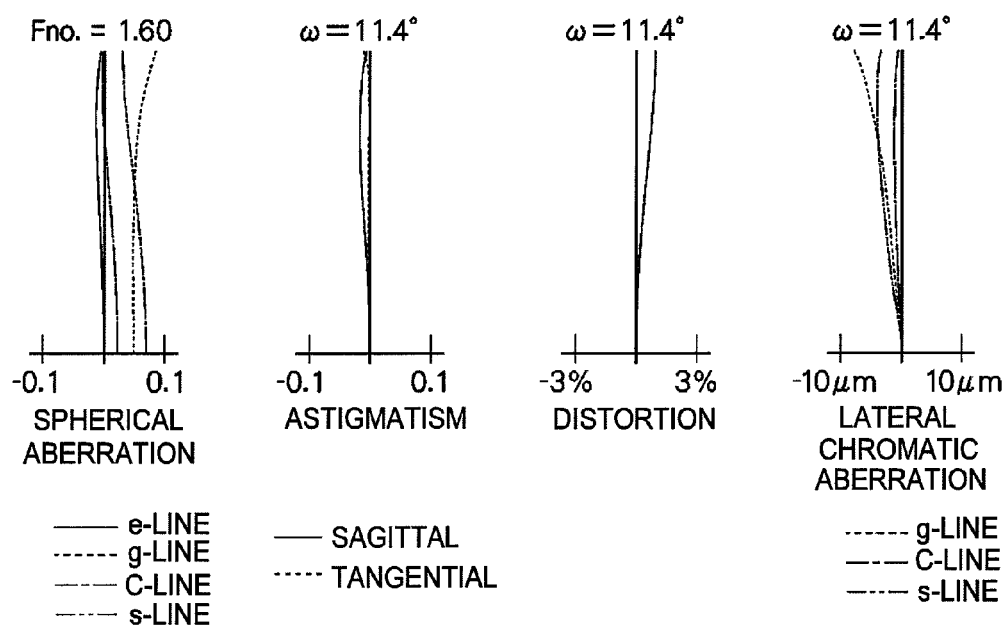
FIG. 8 is a diagram illustrating various aberrations of the imaging lens according to Example 1.
Figure 13:
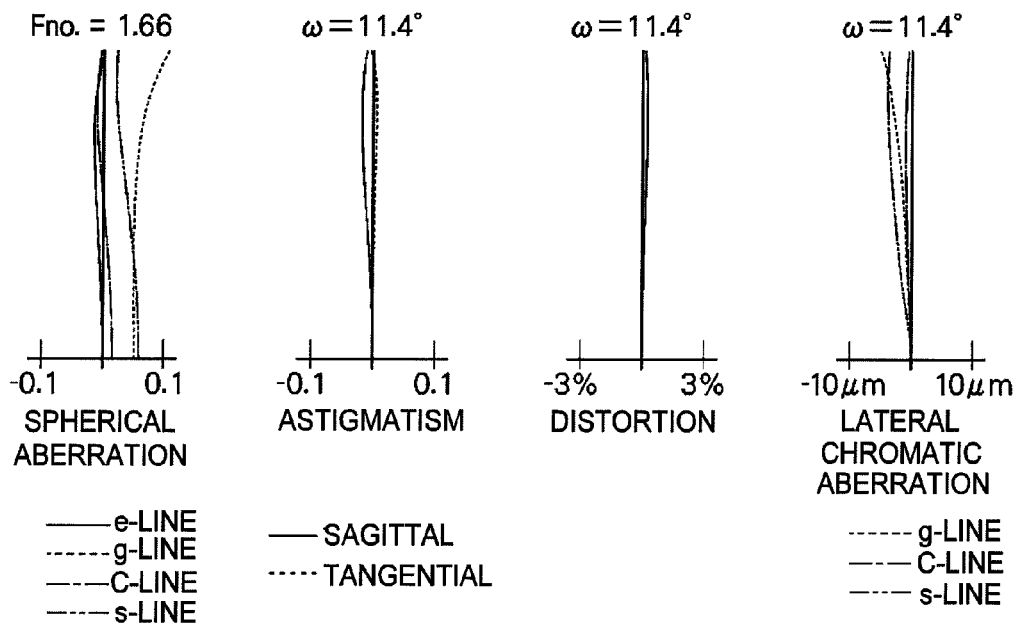
FIG. 13 is a diagram illustrating various aberrations of the imaging lens according to Example 6.

Hereinafter, embodiments of the invention will be described with reference to the accompanying drawings. FIG. 1 is a sectional view illustrating a schematic configuration of an imaging lens according to an embodiment of the invention. Basic Configuration of Imaging Lens (Configuration 1)

As shown in FIG. 1, an imaging lens 100 includes, in order from the object side (in order of the arrow Z shown in the drawing): a front group G1 that has a positive power; an aperture stop St; and a rear group G2 that has a negative power. The imaging lens is configured to form an image of visible and near-infrared light on an imaging plane 14.

The rear group G2 includes a negative meniscus lens L5 that is disposed closer to the object side and has a surface convex toward the object side, and a biconvex lens L6 that is disposed closer to the image side.

In addition, all the lenses constituting the imaging lens 100 are single lenses.

The above-mentioned basic configuration is common to Examples 1 to 6 to be described later.

Furthermore, Z1 shown in FIG. 1 represents the optical axis. The arrow Z represents a direction parallel to the optical axis Z1, and the arrow Y represents a direction orthogonal to the optical axis Z1.

Further, FIG. 1 shows an image pickup apparatus 300 formed by combining the imaging lens 100 and an image pickup device 200 that converts an optical image Kz, which is formed on the imaging plane 14 by the imaging lens 100, into an electric signal.

Additional Configurations of Basic Configuration of Imaging Lens (Configurations 2 to 5)

Configuration 2

The front group G1 may be configured to include only an object side lens section K1 that has a positive power, a single positive meniscus lens L3 that has a surface convex toward the object side, and a single negative lens L4 that has a surface concave toward the image side. Here, it is preferable that the object side lens section K1 of the front group should be formed of one or more lenses in which a lens surface S1 closest to the object side is convex and at least one lens surface is concave.

As described above, the lens surface S1 closest to the object side of the imaging lens 100 may be formed to be convex. In this case, the imaging lens 100 can be made to be smaller in external diameter, and can be reduced in size even when the aperture is large.

Further, at least one lens surface of the lens surfaces constituting the lens section K1 of the front group may be formed to be concave. In this case, it is possible to elongate the back focal length.

Further, the positive meniscus lens L3 having a surface convex toward the object side may be provided. In this case, all the centers of curvature of both lens surfaces S5 and S6 constituting the positive meniscus lens L3 can be positioned to be close to the aperture stop of the positive meniscus lens. Therefore, it is possible to suppress occurrence of comatic aberration, image field curvature, and distortion.

Furthermore, the single negative lens L4 having a surface concave toward the image side may be provided. In this case, it is possible to suppress the occurrence of comatic aberration, image field curvature, and distortion more reliably.

The above-mentioned Configuration 2 is common to Examples 1 to 6 to be described later.

Configuration 3

It is preferable that the imaging lens 100 should satisfy both of Expression (1) of $1.8 < nd3 < nd4$ and Expression (2) of $15 < vd3 - vd4$. In addition, it is more preferable that the imaging lens 100 should satisfy both of Expression (1') of $1.82 < nd3 < nd4$ and Expression (2') of $20 < vd3 - vd4 < 25$.

Here, nd3 is the refractive index of the positive meniscus lens L3 of the front group at the d-line, vd3 is the Abbe number of the positive meniscus lens L3 of the front group at the d-line, nd4 is the refractive index of the negative lens L4 of the front group at the d-line, and vd4 is the Abbe number of the negative lens L4 of the front group at the d-line.

As described above, the configuration may have been made so that Expressions (1) and (2) are satisfied. In this case, it is possible to satisfactorily correct on-axis lateral chromatic aberration (on the optical axis Z1) while suppressing occurrence of comatic aberration and astigmatism.

Furthermore, the configuration may have been made so that Expression (1') of 1.82<nd3<nd4 and Expression (2') of 20<vd3−vd4<25 are satisfied. In this case, it is possible to satisfactorily correct on-axis lateral chromatic aberration while suppressing occurrence of comatic aberration and astigmatism.

The above-mentioned Configuration 3 is common to Examples 1 to 6 to be described later.

Configuration 4

It is preferable that the object side lens section K1 of the front group should be formed of only the negative meniscus lens L1 that has a surface convex toward the object side, and the positive lens L2 that has a surface convex toward the object side.

When the object side lens section K1 of front group is configured as described above, it is possible to correct spherical aberration and comatic aberration satisfactorily. As a result, it is possible to increase the resolving power of the imaging lens.

The above-mentioned Configuration 4 is applied to Examples 1 to 5 to be described later.

Configuration 5

It is preferable that the object side lens section K1 of the front group should be formed of only a single positive meniscus lens that has a surface convex toward the object side.

When the object side lens section K1 of the front group is configured as described above, the imaging lens 100 can be constituted by a small number of lenses. As a result, it is possible to further reduce the size of the imaging lens 100.

The above-mentioned Configuration 5 is applied to only Example 6 to be described later.

SPECIFIC EXAMPLES

Hereinafter, numerical value data and the like of the imaging lenses according to Examples 1 to 6 of the invention will be collectively described with reference to FIGS. 2 to 7 and FIGS. 8 to 13. Furthermore, some reference numerals and signs the same as those of FIG. 1 such as the above-mentioned imaging lens 100 exist in FIGS. 2 to 7. The reference numerals and signs represent the components corresponding to each other.

FIGS. 2 to 7 are sectional views illustrating respective schematic configurations of the imaging lenses according to Examples 1 to 6.

Tables 1A and 1B to 6A and 6B are diagrams showing respective basic data of the imaging lenses according to Examples 1 to 6. The upper part (indicated by the reference sign A in each diagram) of each diagram shows lens data, and the lower part (indicated by the reference sign B in each diagram) of each diagram shows a schematic specification of each imaging lens. Furthermore, Tables 1A and 1B to 6A and 6B are collectively given at the end of "DESCRIPTION OF THE PREFERRED EMBODIMENTS".

In each lens data shown in each of Tables 1A to 6A, the surface number represents the sequential number of i-th (i=1, 2, 3 . . . ) lens surface that sequentially increases as it gets farther from the position closest to the object side and gets closer to the image side. In the lens data, the aperture stop St (i=9) is also referenced by the surface number. Furthermore, it is assumed herein that all the lens surfaces are spherical surfaces.

In the lens data, Ri (i=1, 2, 3 . . . ) represents a radius of curvature of i-th surface, and Di (i=1, 2, 3 . . . ) represents an on-axis surface spacing on the optical axis Z1 between the i-th surface and the (i+1)th surface. The reference signs Ri of the lens data correspond to the reference signs Si (i=1, 2, 3 . . . ) representing the lens surfaces in FIG. 1.

In the lens data, Ndj represents the refractive index of the j-th (j=1, 2, 3, . . . ) optical element, of which the sequential number sequentially increases as it gets farther from the position closest to the object side and gets closer to the image side, at a wavelength of 587.6 nm (at the d-line). In addition, vdj represents the Abbe number of the j-th optical element at the wavelength.

Furthermore, in Examples 1 to 5, the object side lens section K1 of the front group is formed of the two lenses L1 and L2. In Example 6, the object side lens section K1 of the front group is formed of the single lens L1. For this reason, the lens data of Table 6A does not show the data corresponding to the surface numbers of 3 and 4. Specifically, in Example 6, the lens data of Table 6A shows only the surface numbers of 3 and 4 corresponding to the lens surfaces S3 and S4 constituting the lens L2 which does not actually exist.

In each lens data of Tables 1A and 1B to 6A and 6B, the radius of curvature and the on-axis surface spacing are represented in units of mm. In addition, it is assumed that the algebraic sign of the radius of curvature of the surface convex toward the object side is positive, and the algebraic sign of the radius of curvature of the surface convex toward the image side is negative.

Further, each of Tables 1B to 6B shows the values of f which represents the focal length, Bf which represents the back focal length, nd3 which represents the refractive index of the positive meniscus lens L3 of the first group at the d-line, and nd4 which represents the refractive index of the negative lens L4 of the front group at the d-line.

Further, $\Delta v34$ shown in each of Tables 1B to 6B represents a difference ($\Delta v34 = vd3 - vd4$) between the value vd3 of the Abbe number of the positive meniscus lens L3 of the front group at the d-line and the value vd4 of the Abbe number of the negative lens L4 of the front group at the d-line.

FIGS. 8 to 13 are diagrams illustrating various aberrations of the imaging lenses according to Examples 1 to 6. Furthermore, in the drawings, the d-line is a wavelength of 587.6 nm, the e-line is a wavelength of 546.1 nm, the g-line is a wavelength of 435.8 nm, the C-line is a wavelength of 656.3 nm, and the s-line is a wavelength of 852.1 nm (infrared light).

Furthermore, when the ideal image height is expressed by f×tan θ where f is a focal length of the whole lens system and θ (treated as a variable, 0≦θ≦ω) is a half angle of view, the distortion diagram shows the amount of deviation from the ideal image height.

As can be seen from the numerical value data and the aberration diagrams of Examples 1 to 6, the imaging lens according to the embodiment of the invention has high weatherability, is less likely to cause performance degradation, and has an optical performance excellent across a wide wavelength region from the visible wavelength region to the near-infrared wavelength region.

Furthermore, the invention is not limited to the embodiment and examples mentioned above, and may be modified to various forms without departing from the technical scope of the invention. For example, the values of the radius of curvature, on-axis surface spacing, refractive index, and the like of the lens components are not limited to the values noted in the respective tables, and may have other values.

Figure 14:
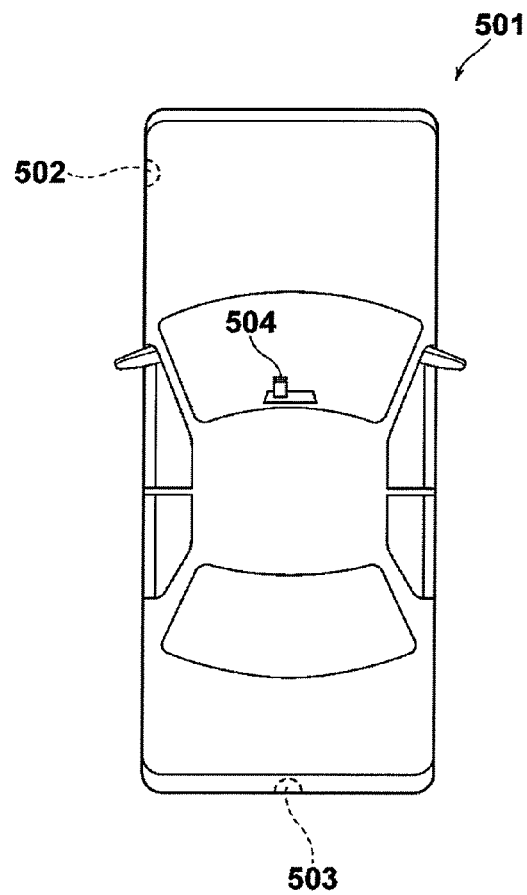
FIG. 14 is a diagram illustrating a vehicle equipped with an image pickup apparatus according to an embodiment of the invention.

Image Pickup Apparatus Using Imaging Lens According to Embodiment of the Invention FIG. 14 is a diagram illustrating a vehicle equipped with an on-board camera as an example of an image pickup apparatus according to an embodiment of the invention. The image pickup apparatus includes the imaging lens according to the embodiment of the invention, and an image pickup device that receives light of an optical image, which is formed by the imaging lens, and converts the light into an electric signal.

As shown in FIG. 14, the on-board cameras 502 to 504 having the image pickup apparatuses according to the embodiment of the invention can be used by being mounted on the vehicle 501. The on-board camera 502 is an outside-vehicle camera for photographing the blind spot area of the passenger seat side, and the on-board camera 503 is an outside-vehicle camera for photographing the blind spot area of the rear of the vehicle 1. Further, the on-board camera 504 is an in-vehicle camera disposed on the rear of an inside mirror and for photographing the same visual field range as the driver.

TABLE 1A

EXAMPLE 1

| SURFACE NUMBER | Ri | Di | Ndj | Vdj |
|---|---|---|---|---|
| 1 | 19.818 | 2.50 | 1.92286 | 18.9 |
| 2 | 12.441 | 1.78 | | |
| 3 | 18.159 | 3.39 | 1.88300 | 40.8 |
| 4 | −116.869 | 0.20 | | |
| 5 | 8.064 | 3.25 | 1.88300 | 40.8 |
| 6 | 15.874 | 0.96 | | |
| 7 | 16.881 | 0.85 | 1.92286 | 18.9 |
| 8 | 6.717 | 1.08 | | |
| (St) 9 | ∞ | 0.37 | | |
| 10 | 25.436 | 0.81 | 1.63980 | 34.5 |
| 11 | 5.437 | 2.00 | | |
| 12 | 9.752 | 2.62 | 1.78800 | 47.4 |
| 13 | −17.458 | | | |
| (Kz)14 | ∞ | | | |

TABLE 1B

| f | 16.20 |
|---|---|
| Bf | 5.77 |
| nd3 | 1.88300 |
| nd4 | 1.92286 |
| Δv34 | 21.9 |

TABLE 2A

EXAMPLE 2

| SURFACE NUMBER | Ri | Di | Ndj | Vdj |
|---|---|---|---|---|
| 1 | 20.522 | 2.00 | 1.83400 | 37.2 |
| 2 | 12.967 | 4.50 | | |
| 3 | 17.188 | 3.80 | 1.78800 | 41.4 |
| 4 | −115.139 | 0.20 | | |
| 5 | 8.450 | 4.01 | 1.88300 | 40.8 |
| 6 | 15.983 | 0.80 | | |
| 7 | 25.492 | 1.50 | 1.92286 | 18.9 |
| 8 | 4.907 | 1.00 | | |
| (St) 9 | ∞ | 0.35 | | |
| 10 | 21.074 | 1.26 | 1.92286 | 18.9 |
| 11 | 13.212 | 2.00 | | |
| 12 | 11.854 | 2.51 | 1.88300 | 40.8 |

TABLE 2A-continued

EXAMPLE 2

| SURFACE NUMBER | Ri | Di | Ndj | Vdj |
|---|---|---|---|---|
| 13 | −20.201 | | | |
| (Kz)14 | ∞ | | | |

TABLE 2B

| f | 16.34 |
|---|---|
| Bf | 6.13 |
| nd3 | 1.88300 |
| nd4 | 1.92286 |
| Δv34 | 21.9 |

TABLE 3A

EXAMPLE 3

| SURFACE NUMBER | Ri | Di | Ndj | Vdj |
|---|---|---|---|---|
| 1 | 45.655 | 2.20 | 1.58144 | 40.7 |
| 2 | 14.502 | 2.50 | | |
| 3 | 13.909 | 4.49 | 1.78800 | 47.4 |
| 4 | −829.954 | 0.20 | | |
| 5 | 9.587 | 4.50 | 1.88300 | 40.8 |
| 6 | 21.846 | 0.80 | | |
| 7 | −1893.400 | 1.50 | 1.92286 | 18.9 |
| 8 | 5.819 | 0.87 | | |
| (St) 9 | ∞ | 0.20 | | |
| 10 | 7.524 | 1.78 | 1.92286 | 18.9 |
| 11 | 6.524 | 2.00 | | |
| 12 | 10.717 | 2.48 | 1.88300 | 40.8 |
| 13 | −21.255 | | | |
| (Kz)14 | ∞ | | | |

TABLE 3B

| f | 16.36 |
|---|---|
| Bf | 5.70 |
| nd3 | 1.88300 |
| nd4 | 1.92286 |
| Δv34 | 21.9 |

TABLE 4A

EXAMPLE 4

| SURFACE NUMBER | Ri | Di | Ndj | Vdj |
|---|---|---|---|---|
| 1 | 58.319 | 2.49 | 1.62588 | 35.7 |
| 2 | 13.063 | 3.35 | | |
| 3 | 16.745 | 4.50 | 1.83481 | 42.7 |
| 4 | −53.904 | 0.20 | | |
| 5 | 8.820 | 4.48 | 1.83481 | 42.7 |
| 6 | 17.819 | 0.80 | | |
| 7 | 51.089 | 1.50 | 1.92286 | 18.9 |
| 8 | 5.596 | 1.14 | | |
| (St) 9 | ∞ | 0.20 | | |
| 10 | 10.779 | 1.59 | 1.92286 | 18.9 |
| 11 | 8.427 | 1.95 | | |
| 12 | 12.578 | 2.38 | 1.83481 | 42.7 |
| 13 | −18.168 | | | |
| (Kz)14 | ∞ | | | |

TABLE 4B

| f | 16.23 |
|---|---|
| Bf | 6.34 |
| nd3 | 1.83481 |
| nd4 | 1.92286 |
| Δv34 | 23.8 |

TABLE 5A

EXAMPLE 5

| SURFACE NUMBER | Ri | Di | Ndj | Vdj |
|---|---|---|---|---|
| 1 | 19.103 | 2.00 | 1.80518 | 25.4 |
| 2 | 10.512 | 0.92 | | |
| 3 | 11.906 | 4.09 | 1.88300 | 40.3 |
| 4 | 2744.380 | 0.20 | | |
| 5 | 7.726 | 2.74 | 1.88300 | 40.8 |
| 6 | 12.582 | 0.80 | | |
| 7 | 18.419 | 0.80 | 1.92286 | 18.9 |
| 8 | 5.599 | 1.00 | | |
| (St) 9 | ∞ | 1.35 | | |
| 10 | 38.529 | 0.75 | 1.51742 | 52.4 |
| 11 | 6.605 | 1.00 | | |
| 12 | 9.144 | 2.96 | 1.81600 | 46.6 |
| 13 | −18.269 | | | |
| (Kz)14 | ∞ | | | |

TABLE 5B

| f | 16.19 |
|---|---|
| Bf | 5.88 |
| nd3 | 1.88300 |
| nd4 | 1.92286 |
| Δv34 | 21.9 |

TABLE 6A

EXAMPLE 6

| SURFACE NUMBER | Ri | Di | Ndj | Vdj |
|---|---|---|---|---|
| 1 | 11.821 | 3.30 | 1.75500 | 52.3 |
| 2 | 66.601 | 0.20 | | |
| 3 | — | — | — | — |
| 4 | — | — | — | — |
| 5 | 9.202 | 3.05 | 1.83481 | 42.7 |
| 6 | 15.861 | 0.80 | | |
| 7 | 517.959 | 1.01 | 1.92286 | 18.9 |
| 8 | 6.420 | 0.76 | | |
| (St) 9 | ∞ | 0.75 | | |
| 10 | 18.526 | 0.80 | 1.51742 | 52.4 |
| 11 | 6.770 | 1.20 | | |
| 12 | 9.875 | 2.94 | 1.88300 | 40.8 |
| 13 | −20.061 | | | |
| (Kz)14 | ∞ | | | |

TABLE 6B

| f | 16.29 |
|---|---|
| Bf | 6.23 |
| nd3 | 1.83481 |
| nd4 | 1.92286 |
| Δv34 | 23.8 |

What is claimed is:

1. An imaging lens for forming an image of visible and near-infrared light, the imaging lens consisting in order from an object side:
   a front group that has a positive power;
   a stop; and
   a rear group that has a negative power,
   wherein the rear group consists in order from the object side,
      a negative meniscus lens that has a surface convex toward the object side, and
      a biconvex lens, and
   wherein all the lenses constituting the imaging lens are single lenses.

2. The imaging lens according to claim 1, wherein the front group consists in order from the object side,
   an object side lens section that has a positive power and includes one or more lenses in which a lens surface closest to the object side is convex and at least one lens surface is concave,
   a single positive meniscus lens that has a surface convex toward the object side, and
   a single negative lens that has a surface concave toward the image side.

3. The imaging lens according to claim 2, wherein both following Expressions (1) and (2) are satisfied:

$$1.8 < nd3 < nd4 \quad (1),$$

and $$15 < vd3 - vd4 \quad (2),$$

where
   nd3 is a refractive index of the positive meniscus lens of the front group at the d-line,
   vd3 is an Abbe number of the positive meniscus lens of the front group at the d-line,
   nd4 is a refractive index of the negative lens of the front group at the d-line, and
   vd4 is an Abbe number of the negative lens of the front group at the d-line.

4. The imaging lens according to claim 2, wherein the object side lens section of the front group consists of
   a negative meniscus lens that has a surface convex toward the object side, and
   a positive lens that has a surface convex toward the object side.

5. The imaging lens according to claim 2, wherein the object side lens section of front group consists of a single positive meniscus lens that has a surface convex toward the object side.

6. An image pickup apparatus comprising:
   the imaging lens according to claims 1; and
   an image pickup device that converts an optical image, which is formed by the imaging lens, into an electric signal.

7. An imaging lens for forming an image of visible and near-infrared light, the imaging lens comprising in order from an object side:
   a front group that has a positive power;
   a stop; and
   a rear group that has a negative power,
   wherein the rear group includes in order from the object side,
      a negative meniscus lens that has a surface convex toward the object side, and
      a biconvex lens,
   wherein all the lenses constituting the imaging lens are single lenses, and
   wherein the front group includes in order from the object side, an object side lens section that has a positive power and includes one or more lenses in which a lens surface closest to the object side is convex and at least one lens surface is concave, a single positive meniscus lens that has a surface convex toward the object side, and a single negative lens that has a surface concave toward the image side.

8. The imaging lens according to claim 7, wherein both following Expressions (1) and (2) are satisfied:

$$1.8 < nd3 < nd4 \quad (1),$$

and $$15 < vd3 - vd4 \quad (2),$$

where nd3 is a refractive index of the positive meniscus lens of the front group at the d-line, vd3 is an Abbe number of the positive meniscus lens of the front group at the d-line, nd4 is a refractive index of the negative lens of the front group at the d-line, and vd4 is an Abbe number of the negative lens of the front group at the d-line.

9. The imaging lens according to claim 7, wherein object side lens section of the front group includes a negative meniscus lens that has a surface convex toward the object side, and a positive lens that has a surface convex toward the object side.

10. The imaging lens according to claim 7, wherein the object side lens section of front group includes a single positive meniscus lens that has a surface convex toward the object side.

11. An image pickup apparatus comprising:

the imaging lens according to claims 7; and an image pickup device that converts an optical image, which is formed by the imaging lens, into an electric signal.

* * * * *